Patented Jan. 20, 1953

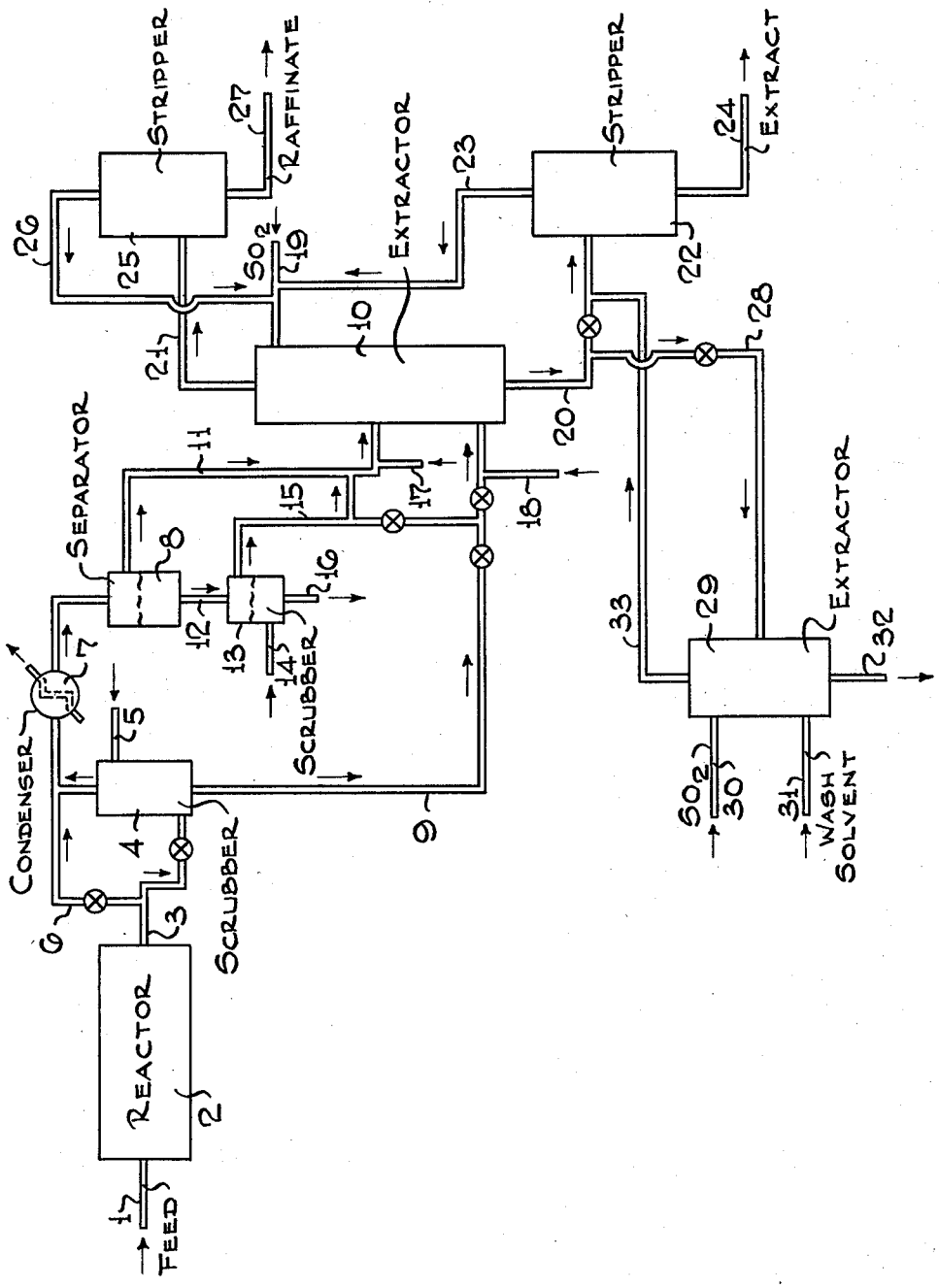

2,626,276

UNITED STATES PATENT OFFICE 2,626,276

RECOVERY OF ORGANIC OXYGEN-CONTAINING COMPOUNDS FROM MIXTURES OF HYDROCARBON OILS

Henry J. Hibshman, Plainfield, N. J., assignor to Standard Oil Development Company, a corporation of Delaware Application December 13, 1947, Serial No. 791,592

4 Claims. (Cl. 260—450)

The present invention is concerned with the recovery of oxygen-containing organic compounds from mixtures thereof with hydrocarbon oils, particularly with hydrocarbon oils of substantially the same boiling range, by a process involving extraction with sulfur dioxide in conjunction with a high boiling wash solvent insoluble in sulfur dioxide.

Various processes are known to the art in which a mixture of hydrocarbons and organic oxygen-containing compounds are produced. Some of these processes are the low temperature carbonization of coal, peat and similar materials, destructive hydrogenation of coals, wood and shales, the methanol synthesis, and numerous oxidation processes, particularly the oxidation of propane and of petroleum oil fractions such as is described in Ellis' Chemistry of Petroleum Derivatives, vol. 1, chapter 36, pages 830 to 845. This invention is also particularly applicable to products resulting from a process whereby hydrogen and oxides of carbon are reacted in the presence of a catalyst to produce synthetic hydrocarbons, water and numerous organic oxygenated compounds. The oxygen-containing compounds produced in this synthesis operation may be a major product or a relatively small by-product depending upon the operating conditions. These oxygenated materials are extremely valuable as chemicals. Normally they consist of a mixture of alcohols, acids, aldehydes, ketones and esters. They are, however, difficult to separate from the hydrocarbon oil because they (1) are are so numerous, (2) boil within the same range as the hydrocarbon oils and, in addition, (3) often form azeotropes with each other and with the hydrocarbon oils.

Normally when the products of the above-described synthesis operation are condensed and allowed to settle the condensate separates into a di-phase system, that is, an upper oil layer comprising substantially hydrocarbons and hydrocarbon-soluble materials and a lower water phase comprising substantially water and water-soluble materials. The oxygen-containing organic compounds formed in the synthesis operation range from very low molecular weight compounds to very high molecular weight compounds and therefore, find themselves distributed throughout the oil phase and the water phase, the proportion in each phase depending on their solubilities in the respective phases. In general, it can be said that the bulk of the organic oxygen-containing compounds of one to four carbon atoms will enter the aqueous phase while the bulk of the compounds containing 5 carbon atoms and above per molecule will be found in the oil layer, although it should be borne in mind that the separation of materials into their respective phase is often-times not clean-cut and depends to a large extent upon the conditions involved and the over-all composition of the materials in the condensate. In general, a better separation is obtained with the compounds containing 1, 2 and 3 carbon atoms, and those containing 7 and more carbon atoms per molecule; the 1, 2 and 3 carbon atom molecules going principally into the water phase, while the molecules containing 7 or more carbon atoms go principally into the oil. The compounds containing 4, 5 and 6 carbon atoms per molecule are in general split between the two phases.

In this invention, we are concerned with the separation and recovery in one operation of all the organic oxygen-containing compounds such as alcohols, acids, esters, aldehydes, ketones, etc., from their mixtures with hydrocarbon oils. The invention is particularly applicable to the products resulting from the previously mentioned hydrocarbon synthesis reaction whereby hydrogen and oxides of carbon are reacted in the presence of catalysts. According to the process of this invention the mixture of oxygen-containing compounds and hydrocarbon oils is extracted with sulfur dioxide in conjunction with a wash solvent insoluble in sulfur dioxide, preferably in a countercurrent operation and preferably in a liquid-liquid extraction whereby the oxygen-containing compounds dissolve in the sulfur dioxide forming the extract phase, leaving the raffinate phase composed substantially of the hydrocarbons and the wash solvent.

The material subjected to extraction, according to the terms of this invention, is complex in nature. It is composed of hydrocarbons including paraffins, olefins and in some cases, small amounts of aromatics. In addition, it contains anywhere up to about 50% or more of oxygen-containing organic compounds such as alcohols, acids, esters, ketones, aldehydes, and condensation products thereof. In cases where the material is derived from the hydrocarbon synthesis operation, the oil will have dissolved in it certain proportions of each, alcohols, acids, aldehydes, ketones and esters. The esters predominate among the high boiling compounds, particularly that fraction boiling above 350° F. while carbonyl compounds, that is, aldehydes and ketones, acids and alcohols, predominate among the oxygen-containing compounds boiling at temperatures up to about 350° F. The acid concentration reaches a maximum (20%) in the intermediate range (275° F. to 400° F.) several fold higher than at either extreme (5 to 6%). Ordinarily the amounts of alcohols and acids found decrease with increasing temperatures due undoubtedly to the fact that they undergo esterification reactions. The oxygen content of the total hydrocarbon oils resulting from the synthesis operation, i. e. oil layer plus water layer, generally run from 5 wt. percent to 20 wt. percent.

The process of the invention involves the extraction of oxygen-containing compounds from mixtures thereof with hydrocarbon oils, particularly those within substantially the same boiling range as the oxygen-containing compounds by contacting the mixture with sulfur dioxide in conjunction with a sulfur dioxide-insoluble wash solvent, preferably in a countercurrent liquid-liquid extraction operation. It has been found that an extract is formed containing 70 to 95% of the oxygen-containing compounds contained in the mixture. The hydrocarbons remain in the raffinate phase. In the extraction the sulfur dioxide-insoluble wash solvent is introduced at least in part at the end of the extraction zone from which the sulfur dioxide extract is withdrawn. If desired, wash solvent may also be introduced at intermediate points in the extraction zone or it may be added at least in part with the feed stock. In this feature of the invention, the less sulfur dioxide-soluble components are concentrated in the wash solvent and the more sulfur dioxide-soluble components remain in the solvent. When this washing is carried out in a countercurrent manner, contamination of the more sulfur dioxide-soluble components in the solvent with the less sulfur dioxide-soluble components may be avoided by the introduction of a quantity of the wash solvent into the system at the point from which the extract is removed. In such an operation the feed is introduced at an intermediate point in the extraction zone.

Wash solvents which may be employed in conjunction with $SO_2$ in accordance with this invention include a large number of non-aromatic hydrocarbon oils, e. g. light hydrocarbons such as pentane, hexane, etc., oils of the kerosene and diesel oil boiling range, lubricating oils, but particularly the highly paraffinic white oils boiling in the range of 300° F. and higher, and the hydrocarbon oils produced in the hydrocarbon synthesis operation and recovered as raffinate from the extraction process itself. Such latter oils boiling in the range of 300–700° F. may be used, preferably those boiling above 400° F. In the white oil class those oils boiling between 500° F. and 900° F. are preferred. In general, the hydrocarbon oil employed must be of sufficiently high molecular weight that, when it is mixed with sulfur dioxide and with the sulfur dioxide-extract it forms two phases at the temperature of the extraction. Generally, also the lower the molecular weight of the hydrocarbon oil employed as wash solvent, the lower is the temperature at which the sulfur dioxide extraction must be carried out to assure phase separation. The boiling range of the wash solvent employed should be such that it can be readily separated from the material extracted. For example, if the oxy-compounds being extracted boil in the range up to 550° F., a white oil boiling in the range of 600° F. and above may be employed as the wash solvent.

The sulfur dioxide extraction may be carried out at high or low temperatures depending upon the nature of the wash solvent, preferably between −50° F. and +300° F. In the event that low temperatures around −50° F. are employed, a wash solvent such as pentane or other low boiling hydrocarbons may be employed. At temperatures around +34° F. and above, pentane is completely miscible with sulfur dioxide. Therefore, when pentane is used as the wash solvent the extraction should be conducted at temperatures between about −50° F. and +30° F. At higher extraction temperatures, i. e. room temperature to about 300° F., higher boiling wash solvents such as inert paraffinic oils boiling above 500 to 900° F. should be employed.

In one embodiment of this invention, the wash oil employed in the sulfur dioxide extraction step is a high boiling fraction separated from the sulfur dioxide raffinate phase. In another embodiment, the wash oil solvent employed in the extraction step is used prior to its use in the extraction step to remove lower molecular weight oxygen-containing compounds from the water layer of the synthesis product. In this manner, all of the oxygen-containing compounds from the water layer and oil layer will be concentrated in the sulfur dioxide extract. In still another embodiment of the invention, the wash oil used in the extraction is used, prior to its use in the extraction operation, to scrub out oxygen-containing compounds and hydrocarbons from the products of the reaction by which they are produced. For example, in the hydrocarbon synthesis operation the entire product emerging as a vapor from the synthesis reactor is so scrubbed. This scrubbing is carried out at a temperature above the dew point of water at the pressure of the operation. By operating in this manner, water is considerably excluded from the sulfur dioxide extraction feed. The sulfur dioxide treat is generally between 50 and 800 volume percent, preferably from 100 to 300 volume percent solvent, and the wash solvent employed is between 25 and 800 volume percent per treat, preferably from 50 to 300 volume percent. The pressure employed in the process need not be much greater than atmospheric pressure. The pressure should be sufficient preferably to keep the sulfur dioxide and the hydrocarbons in the liquid phase under the extraction conditions. Generally, pressures in the range of 1 to 10 atmospheres will suffice.

The feed to the extraction process may or may not be treated prior to the sulfur dioxide extraction. For example, the feed may be completely dehydrated by distilling off the material boiling below 212° F. prior to the sulfur dioxide extraction, or the feed may be treated with water or with a portion of the water layer in the event the feed is that resulting from the hydrocarbon synthesis operation. This water treatment, in one or more stages, easily extracts material boiling up to 212° F. Likewise, the feed may be treated with various solvents to remove the lower boiling material. Generally, the sulfur dioxide extraction will be more effective if the oxygen-containing compounds of low molecular weight, especially of one to about five carbon atoms, are removed from the feed prior to extraction. In a similar manner, the extremely high boiling materials contained in the feed may likewise be removed prior to extraction. For example, that portion of the feed boiling at around 550° F. and above may be removed in order to permit extraction at lower temperatures at which ordinarily the high boiling material, for example waxy fractions, would precipitate. Also, the feed to the extraction process may be fractionated into one or more fractions prior to the sulfur dioxide extraction. For example, if the preparation of high octane gasoline from a hydrocarbon oil-oxygen-containing compound mixture is desired, the mixture may be subjected to fractionation to remove a fraction boiling in the gasoline range. This gasoline fraction is then subjected to sulfur dioxide extraction for removal of oxygen-containing compounds leaving a purified high octane gasoline raffinate. Lube oil fractions may be obtained and treated in a similar manner.

The sulfur dioxide extract containing the oxygen-containing compounds may be treated after removal of the solvent therefrom for recovery of the individual desirable oxygen-containing compounds by any suitable means such as various combinations of distillation, extractive distillations and liquid-liquid extraction.

The drawing indicates in a general way the process flow which characterizes the present invention. The drawing indicates diagrammatically in elevational cross-section one arrangement of plant apparatus in which operations typical of the extraction process may be carried out.

Referring to the drawing, a mixture of hydrogen and carbon oxides is passed via line 1 into reactor 2 containing a catalyst such as sintered red iron oxide promoted with potassium carbonate. In the reactor the hydrogen and carbon oxides are reacted at a temperature of 300° F. to 800° F., preferably about 650° F., and at pressures in the range of 25 to 750 p. s. i. preferably about 400 p. s. i. The gaseous effluent leaves the reactor via line 3 and is passed to scrubber 4 in which it is countercurrently scrubbed with wash solvent of the type previously discussed, entering scrubber 4 through line 5. Alternatively, the gaseous effluent may pass through line 6 to condenser 7 and be allowed to enter separator 8 in which the condensate settles and separates into two phases. viz., an upper oily layer and a lower water layer. Returning to scrubber 4, the wash solvent picks up hydrocarbons and oxygenated compounds, contained in the gaseous effluent from the hydrocarbon synthesis reactor and this extract is withdrawn via line 9 for introduction to extractor 10. Additional wash solvent may be added via line 18. In the event that the total gaseous effluent is condensed and allowed to separate into two layers as described, the oil layer is charged to extractor 10 via line 11. The water layer is passed via line 12 to scrubber 13 where the water layer is countercurrently scrubbed with wash solvent entering through line 14. The wash solvent picks up hydrocarbon and oxy compounds from the water layer and they are withdrawn from the scrubber via line 15 and carried to extractor 10 by admixture with the oil layer entering through line 11. Additional wash solvent may be added through line 17. The bottoms from the scrubber 13 are removed by line 16 and are processed for further recovery of hydrocarbons and oxy compounds therefrom. Thus, it is seen that the feed to extractor 10 can be either (1) the oil layer resulting from the synthesis condensate, (2) the oil layer plus the scrubbed water layer or (3) the scrubbed total gaseous effluent from the synthesis reactor; the scrubbing agent in each instance being the wash solvent to be employed in the subsequent extraction step.

Returning now to extractor 10, the mixture of hydrocarbon oil and oxy compounds enters either through line 11 or through line 9 or through a number of split feed lines. However, preferably the feed is added at a point near or below the midpoint of the extractor 10. In the event that the feed to the extractor has not previously been scrubbed with the wash solvent, wash solvent is added to the feed through line 17 or to the extractor through lines 18 and 9. Liquid sulfur dioxide enters the top of the extractor through line 19. Countercurrent flow of sulfur dioxide, the feed and the wash solvent, occurs in the extractor and the sulfur dioxide extract containing oxygen-containing compounds dissolved from the feed is withdrawn from the bottom of the extraction zone via line 20. The raffinate consisting substantially of the wash solvent and the hydrocarbon oil is withdrawn from the extractor through line 21. The extract is led to stripper 22 for removal therefrom of sulfur dioxide via line 23 for return to feed line 19. The bottoms from the stripper 22 consist of oxygen-containing compounds and small amounts of wash solvent and the mixture is removed via line 24 and treated for recovery of the oxy compounds therefrom by such known means as fractionation, solvent extraction, extractive distillation, or other desirable means not shown. The raffinate is led to stripper 25 from which sulfur dioxide is distilled off and returned via line 26 to feed line 19. Bottoms from the stripper consist substantially of hydrocarbons and wash solvent and are removed via line 27 for separaton, such as by fractionation, solvent extraction, extractive distillation, or other desirable means not shown in the drawing.

In the event that the sulfur dioxide extract being removed from the extractor via line 20 contains material such as aromatic hydrocarbons and some low boiling olefinic hydrocarbons which are more readily extracted from the feed by sulfur dioxide than the oxygen-containing compounds, the extract is wholly or partly diverted with or without fractionation by distillation of the diverted portion from stripper 22 and led via line 28 to extractor 29 entering at a point near or below the midsection thereof. In the extractor 29, the extract prior to removal of $SO_2$ therefrom, is treated countercurrently with a second portion of $SO_2$ entering through line 30 and a second portion of wash solvent entering through line 31. The secondary extract containing a higher proportion of aromatic hydrocarbons and olefinic hydrocarbons, is removed from the extractor via line 32 and can be processed for recovery of valuable aromatic and olefinic material therefrom. The secondary raffinate is removed from extractor 29 via line 33 and is led to stripper 22 for recovery of oxy compounds therefrom as previously described. When such a modification is employed, it should be readily understood that the bottoms emerging from stripper 22 via line 24 will have to be treated by fractionation, solvent extraction, or other methods to separate the oxy compounds from the wash solvent.

Various runs have been made to demonstrate the selectivity of sulfur dioxide for oxygen-containing compounds. Selectivities for some of the oxygen-containing compounds at practical extraction capacities have been obtained from experiments and are summarized in the following table:

$SO_2$ selectivity for oxy compounds

| Components to be Separated | | Temp., °F. | Extract Solubility [1] weight percent | Selectivity beta [2] |
|---|---|---|---|---|
| Hydrocarbon | Oxy Compound | | | |
| Diisobutylene | Ethyl alcohol | −50 | 18 | 3.6 |
| Do | Methyl ethyl ketone | −50 | 14 | 9.6 |
| White oil (500–900° F. initial B. P.). | Lauryl alcohol (500–900° F. initial B. P.). | 72 | 14 | 6.6 |
| Do | Ethyl alcohol (500–900° F. initial B. P.). | 72 | 75 | >51 |
| Do | Acetic acid (500–900° F. initial B. P.). | 72 | 75 | >70 |

[1] Weight percent feed component plus wash solvent in extract phase.
[2] Beta = weight ratio oxy compound/hydrocarbon in extract/weight ratio oxy compound/hydrocarbon in raffinate (solvent and wash solvent free basis).

The results of these and other studies indicate that the capacities of sulfur dioxide for the oxygen-containing compounds increase with the molecular weight of the oxygen-containing compound. Experimental results also indicate that sulfur dioxide has extremely good extraction capacity for oxygen-containing compounds of different chemical types and that this capacity is greatest for esters and acids.

A particularly significant feature of the effectiveness of sulfur dioxide as a solvent for the particular extraction process of this invention is the very high capacity of sulfur dioxide for extracting practically all of the oxygen-containing compounds regardless of their chemical nature in a single extraction. This feature is of considerable practical and commercial interest since no other solvent has been reported capable of performing this particular function.

A number of extractions have been made to recover oxygen-containing compounds from hydrocarbon oils prepared in a hydrocarbon synthesis operation. The feed stock employed in these extractions was a synthetic oil (particularly a fraction from which the material boiling below 200° F. had been removed) prepared by reacting hydrogen with carbon oxides in the presence of a sintered red iron oxide catalyst promoted with potassium carbonate. These extractions were carried out in continuous countercurrent operation employing sulfur dioxide in a 2 in. inner diameter tower 23 ft. high, packed with Raschig rings using a 600–900° F. initial boiling point paraffinic white oil as a wash solvent. Data from these runs are listed in the following table:

EXAMPLE I

| Run No. | | 1 | 2 | 3 |
|---|---|---|---|---|
| Extraction conditions: | | | | |
| $SO_2$ treat, vol. percent | | 290 | 340 | 340 |
| White oil treat, vol. percent | | 270 | 500 | 500 |
| Temperature, °F. | | 63 | 68 | 66 |
| Tower feed points— | | | | |
| $SO_2$ | | (1) | (1) | (1) |
| White oil | | (2) | (2) | (2) |
| Feed, ft. from top (intermediate) | | 10' | 10' | 5' |
| Extract: | | | | |
| Yield, weight percent 200–550° F. Fraction (based on 200–550° F. in feed) | Feed | 29 | 23 | 8 |
| Oxygen content, weight percent | 2.7 | 8.9 | 12.7 | 16.4 |
| Oxygen compounds, weight percent | 16 | 47 | 54 | 71 |
| Raffinate: | | | | |
| Oxygen content, weight percent | | 0.3 | 0.9 | 1.9 |
| Oxygen compounds, weight percent | | 3.7 | 5.5 | 10 |

[1] Top.
[2] Bottom.

The wash solvent treats were purposely high to help compensate for the insufficient stage equivalents of the tower. Low temperatures at which somewhat higher selectivities might be realized were not employed in order to avoid the use of refrigeration and secondly to prevent precipitation of waxy materials which would occur even in the presence of the solvents used.

The raffinate compositions indicate that good removal of the oxygen-containing compounds from the raffinate is obtained when somewhat higher than theoretical extraction yields are taken. Similarly, high extract purities are indicated under conditions resulting in some loss of oxygen-containing compounds in the raffinate. High extract oxygen-containing compound purities were obtained in the 350 to 550° F. boiling range which is highly significant since extraction of this material with many other solvents is impossible or at best difficult.

The oxygen-containing compound distribution in the extract according to boiling point and chemical type (on a hydrocarbon-free basis) is shown in the following table for Run #1 which is typical of the distribution found in all cases.

Typical oxy-compound distribution

[Fraction analyzed.—Extract of 200–500° F. boiling range (29 weight percent yield on 200–550° F. fraction of feed to extraction; 56.8 volume percent of the original synthesis oil was in this boiling range).]

| Fraction (15 plate, 5/1 R. R.) | | Analysis of distilled extract fractions, weight percent (hydrocarbon-free basis) | | | |
|---|---|---|---|---|---|
| Boiling range, °F. | Yield, vol. percent | Esters | Alcohols | Carbonyls | Acids |
| 178–250 | 6.2 | 19.5 | 25.4 | 50.0 | 5.1 |
| 250–300 | 12.5 | 26.0 | 16.2 | 48.2 | 9.6 |
| 300–354 | 18.8 | 27.8 | 12.3 | 36.2 | 23.7 |
| 354–400 | 23.5 | 44.7 | 17.3 | 15.9 | 22.1 |
| 400–465 | 15.6 | 72.4 | 11.5 | 7.3 | 8.8 |
| 465–531 | 15.6 | 77.4 | 11.7 | 1.0 | 10.1 |
| 531–570 | 7.8 | 78.6 | 12.3 | 3.0 | 6.1 |

Esters and carbonyls predominate in the high and low boiling ranges respectively. The proportion of esters increases several fold (20–80%) as the boiling range goes from 200 to 550° F. while the carbonyl content starts out high and undergoes roughly a 10-fold decrease (50–5%). A several fold increase in acid concentration occurs in the intermediate boiling range (275–400° F.). The alcohols show a tendency to reach maxima at several intermediate points (15–25%) at about 225° F., 300° F., and 475° F. The high ester contents of these fractions is to a large degree attributable to reaction of acids and alcohols during distillations before or after $SO_2$ extraction.

It is significant that the extraction results are consistent with selectivity data for pure compounds and accordingly use of a longer tower should permit even higher recoveries of purer oxy-compounds. A limit on extract purity would be set by the presence of any material in the feed which is more readily extracted than oxy-compounds, such as aromatic hydrocarbons and low boiling olefinic hydrocarbons.

By the extraction process outlined, extract purities of 76 to 95% weight oxygen-containing compounds from fractions both relatively rich and relatively lean in oxygen-containing compounds are obtainable. The use of a higher extraction tower or increased number of stages would permit even a more complete recovery at considerably higher concentration of oxygen-containing compounds (feeds richer in oxygen)

with lower solvent treats. In general, sulfur dioxide extraction of hydrocarbon oils will effect about 75-85% recovery and purity of oxygen-containing compounds when using 3 stages at 300-500 volume percent treat; and about 95% recovery and purity of oxygen-containing compounds when using 8 to 10 stages at 200 volume percent treat.

EXAMPLE II

One three-stage batch countercurrent extraction was made on the 200-550° F. fraction of hydrocarbon synthesis oil containing 8.6 wt. per cent oxygen, produced with sintered $K_2CO_3$ promoted red iron oxide catalyst. The extraction was made at 14° F. using treats of 481 vol. per cent $SO_2$ and 470 vol. per cent Marcol (white oil, boiling point 500-800° F.) wash solvent with the feed stock introduced in the center stage. A 59 vol. per cent raffinate hydrocarbon concentrate containing 1.5 wt. per cent oxygen was obtained. This raffinate oxygen concentration corresponds to 10% of the oxygen in the original feed or to a recovery of 90% of the oxygen in the extract. The distribution according to chemical type of oxy-compounds found in the extract is given in the following table:

Feed stock: 220-550° F. HCS oil produced with sintered $K_2CO$ promoted red iron oxide catalyst.
Extraction conditions (Run C-2): Temperature—+14° F. $SO_2$ Treat—481 volume percent Marcol Treat—470 volume percent Feed to Center State.

| Extract fraction (15 plate, 5/1 R. R.) | | |
|---|---|---|
| Boiling range, ° F. | Vol. percent on ext. | Weight percent oxy-compounds |
| Init.-182 | 3.2 | |
| 182-228 | 12.7 | 63.9 |
| 228-280 | 9.5 | 70.2 |
| 280-292 | 3.2 | |
| 292-340 | 15.8 | 78.1 |
| 340-356 | 3.2 | |
| 356-392 | 16.0 | 82.8 |
| 392-412 | 6.1 | |
| 412-498 | 16.0 | 83.9 |
| 498-600 | 14.3 | 57.8 |

Esters account for the largest volume of oxy-compounds in all but the first extract cut. Carbonyls (aldehydes and ketones) are next in abundance with acids and alcohols in lesser abundance. The preponderance of esters is attributable to esterification of the original alcohols and acids during distillation; they could be converted back to alcohols and acids by hydrolysis. It is particularly significant that the highest oxygenated compound purity was obtained in the higher boiling ranges which are the cuts most difficult to extract with water and most other solvents. The low purity indicated for the 500-600° F. fraction is attributable to contamination with the white oil wash. Without the contamination, the trend of increasing purity with boiling range can be continued, producing a 500-600° F. fraction of 85-90% purity. The purities of all fractions may be impdoved by taking a lower extract yield.

In connection with the extraction process employing sulfur dioxide with the hydrocarbon oxygenated-compound mixtures mentioned, it is significant that no difficulty has been experienced with respect to reactivity of sulfur dioxide with materials present in the reaction step. Sulfur contents of the raffinate and extract from various runs ranged from 0.043 to 0.12% respectively indicating that reactivity of sulfur dioxide does not present a serious problem in the process of this invention.

The nature of the extraction process of the present invention and its practical applications are evident from the preceding specification, drawing and data presented although it is not intended to unduly limit the generally broad scope of the intention thereto.

What is claimed is:

1. An improved process for the separation of paraffinic hydrocarbons and aliphatic oxygenated compounds produced by the catalytic hydrogenation of oxides of carbon which comprises scrubbing the gaseous hydrogenation products with a sulfur dioxide-insoluble substantially non-aromatic hydrocarbon to form an absorbate containing the hydrocarbons and oxygenated compounds formed in the hydrogenation reaction, extracting the absorbate therefrom with liquid sulfur dioxide in a countercurrent operation, separating an extract phase containing the oxygenated compounds and a raffinate phase containing the hydrocarbons produced by the hydrogenation reaction, and recovering the oxygenated compounds from the extract phase.

2. A process according to claim 1 in which the substantially non-aromatic hydrocarbon is a white oil boiling in the range of 300° F. and higher.

3. A process according to claim 2 in which the white oil boils in the range of 500° F. and 900° F.

4. A process according to claim 1 in which the substantially non-aromatic hydrocarbon is a hydrocarbon oil formed in the hydrogenation reaction and boiling in the range of 300°-700° F.

HENRY J. HIBSHMAN.

REFERENCES CITED

The following references are of record in the file of this patent:

UNITED STATES PATENTS

| Number | Name | Date |
|---|---|---|
| 1,746,641 | Ford | Feb. 11, 1930 |
| 1,925,525 | Dietrich et al. | Sept. 5, 1933 |
| 1,970,535 | James | Aug. 14, 1934 |
| 2,004,131 | Reid | June 11, 1935 |
| 2,457,257 | Michael et al. | Dec. 28, 1948 |

FOREIGN PATENTS

| Number | Country | Date |
|---|---|---|
| 441,104 | Great Britain | Jan. 13, 1936 |
| 459,189 | Great Britain | Jan. 4, 1937 |
| 585,352 | Great Britain | Feb. 5, 1947 |

OTHER REFERENCES

U. S. Naval Tech. Mission, October 29, 1945, pp. 72 and 90.